273-294 AU 334 EX

OR RE 7,756

EX 19

155, 152

BEST AVAILABLE COPY

I. N. RICHARDSON,

Assignor to I. W. Richardson.

PLAYING-CARDS.

No. 7,756. Reissued June 19, 1877.

WITNESSES

Samuel D. Kelley

James A. Todd

INVENTOR

Ivory N. Richardson

By Porter & Hutchinson Attys.

SUBSTITUTED FOR MISSING COPY EXAM.

UNITED STATES PATENT OFFICE.

IVORY N. RICHARDSON, OF MALDEN, MASSACHUSETTS, ASSIGNOR TO IVORY W. RICHARDSON.

IMPROVEMENT IN PLAYING-CARDS.

Specification forming part of Letters Patent No. 155,752, dated October 6, 1874; reissue No. 7,756, dated June 19, 1877; application filed March 13, 1876.

DIVISION No. 2.

*To all whom it may concern:*

Be it known that I, IVORY N. RICHARDSON, late of Revere, but now of Malden, in the Commonwealth of Massachusetts, have invented an Improvement in Playing-Cards, of which the following is a specification:

This invention relates to an improvement in that class of cards known as "playing-cards," which are divided into subdivisions known as "suits," and having certain emblems, pictures, or characters upon each card, which indicate not only the suit to which such card belongs, but also its size or value relatively to the other cards in the "pack;" and the invention consists in forming such cards round, or so nearly so as to secure the principal advantages of such form, and having upon each suit of the cards a distinguishing or indicating color, such as black for "spades," red for "hearts," green for "clubs," and yellow for "diamonds," together with figures, numerals, or other indicators placed at the edge or border of the card, which numeral or indicator shall show the size or value of the card, whereby the player, as soon as his eye catches such numeral or indicator upon any card, will, by the color and indicator, at once know of which suit it constitutes a part, and what is its size or value, without the necessity, as heretofore, of discerning the configuration or character of the emblems it bears or the number thereof.

Figure 1:
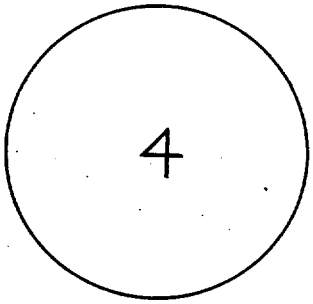
Figure 2:
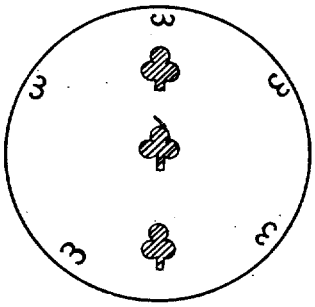
Figure 3:
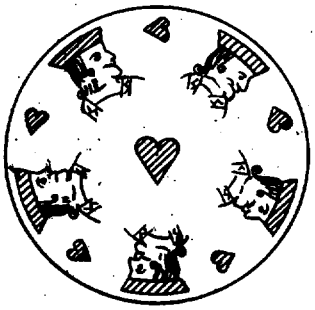

In the accompanying drawings, Figure 1 represents the four of spades; Fig. 2 represents the three of clubs; Fig. 3 represents the [illegible] or knave of hearts, and Fig. 4 represents [illegible]ing of diamonds.

Figure 4:
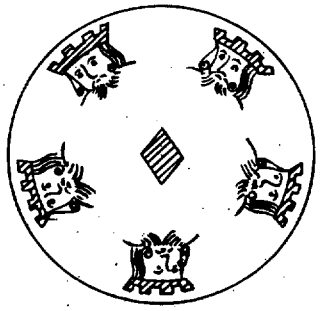

[illegible] Fig. 1 the numeral or figure 4 is represented in black, this color indicating that this card belongs to the suit known as "spades," while the numeral indicates the size or value of the card relatively to the other cards in the pack.

Fig. 2 shows the emblems known as "clubs" arranged across the center of the card, while the numeral or figure 3 is displayed around the border. By coloring these numerals alone, or both the numerals and emblems, green, the player, by observing either of the numerals, would, by its color, know that it belonged to the suit called "clubs," while the character of the figure would indicate the size or value of the card.

In Fig. 3 the emblem known as a "heart" is placed around the card near its edge at several points, and the heads or faces representing the jack are similarly disposed upon the card. By coloring these heads or faces, or the cap on the head, with the adopted indicating or characteristic color, (red,) the player would, without the aid of the emblems, at once know to which suit the card belonged, and its character and value.

In Fig. 4 the heads or faces of the king are shown arranged around the card near its edge, but with the emblem of the diamond omitted, except in the center; and by coloring the face or crown of the king with the adopted indicating or characteristic color (yellow) the player, by observing the crown and its color, can at once determine as to which suit the card constitutes a part.

By forming my cards round, and arranging the heads or emblems and figure around the edge or border, as stated, and employing as many different colors as there are suits, the cards, when assembled, are always in proper relative positions to each other; and the part, at least, of such emblems or numerals or faces as is in view upon a card, however it be held, is sufficient to enable the player to know its size or value and its suit.

I do not confine myself to the indicating colors herein specified, as others may be used; but I prefer those described. The faces may be of any desired colors or shades, while the accompanying emblems are of the indicating colors. Both the emblems and the border-numerals may be employed, as shown in Fig. 2, or the numerals alone. The emblematic cards may, instead of having the emblems printed or shown thereon, be indicated solely by color and number, as shown in Fig. 1.

I do not claim a round card, nor do I claim, broadly, the employment of an indicating color for each suit of cards in the pack, or the combination of the indicating-numerals with the emblems; but What I do claim is—

Round playing-cards, each suit whereof is indicated by a distinguishing color, and is also provided with numerals or figures to indicate the size or value of the cards, substantially in manner as described and shown.

IVORY N. RICHARDSON.

Witnesses:
WM. H. HART,
EUGENE HUMPHREY.